United States Patent [19]
Kansier

[11] 3,834,730
[45] Sept. 10, 1974

[54] SLING MEANS FOR SHOULDER HARNESS

[75] Inventor: Denis A. Kansier, Plymouth, Mich.

[73] Assignee: Ford Motor Company, Dearborn, Mich.

[22] Filed: Oct. 2, 1973

[21] Appl. No.: 402,675

[52] U.S. Cl. .......................................... 280/150 SB
[51] Int. Cl. ............................................ B60r 21/10
[58] Field of Search ................................ 280/150 SB

[56] References Cited
UNITED STATES PATENTS
3,236,540  2/1960  Berton ........................ 280/150 SB
3,521,901  7/1970  Wackym ...................... 280/150 SB

*Primary Examiner*—Robert R. Song
*Attorney, Agent, or Firm*—Keith L. Zerschling; John J. Roethel

[57] ABSTRACT

Sling means for supporting a shoulder harness from a roof rail of a vehicle body. The sling means includes a strap having a loop means at one end to which a ring assembly means is coupled. The improvement comprises a projecting means on the ring assembly means extending longitudinally of the strap and encompassed by a pocket means sewn between layers of the strap. The projecting means and pocket means coact to restrain the ring assembly means against twisting or rotating movement in the plane of the strap.

5 Claims, 3 Drawing Figures

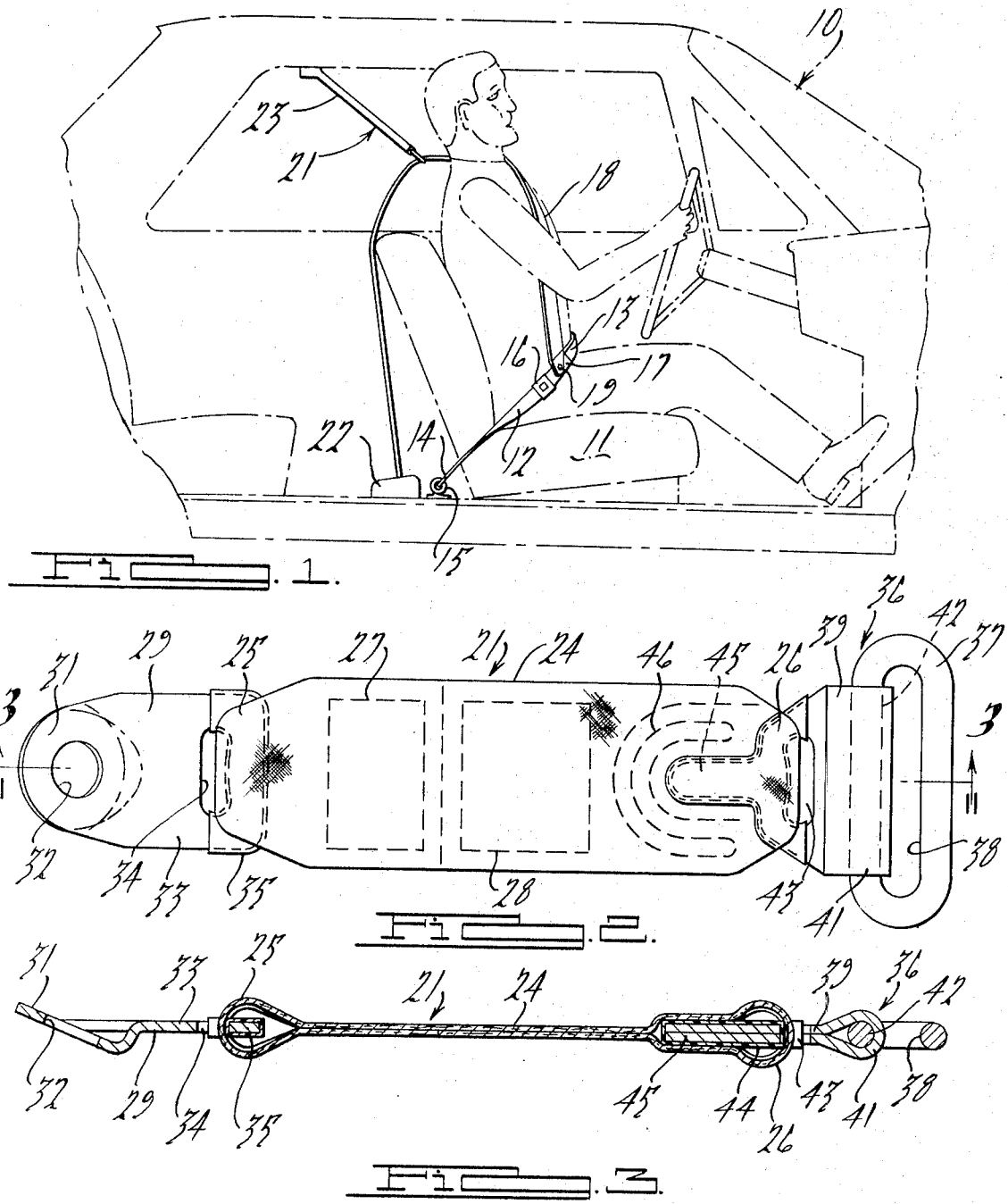

SLING MEANS FOR SHOULDER HARNESS

BACKGROUND OF THE INVENTION

U.S. Pat. No. 3,236,540 issued Feb. 22, 1966 to R. J. Berton et al. for "Safety Harness" discloses a sling supporting a shoulder harness strap from the roof rail of a vehicle body.

The primary function of the sling is to insure that the shoulder harness strap passes over the shoulder of the vehicle operator at a proper angle for compliance with the requirements of the Federal Motor Vehicle Safety Standards. The use of the sling is particularly necessitated when the shoulder harness retractor mechanism is mounted on the vehicle floor behind the vehicle seat to which the shoulder harness is related.

It has been found, however, that a simple ring for guiding the harness strap, which ring passes through a loop in the lower end of the sling, under certain vehicle impact conditions could rotate relative to the sling end and cut the harness webbing.

It is an object of the present invention to provide a tab or finger on the guide ring assembly adapted to function as an anti-rotating means preventing rotation of the guide ring assembly relative to the end of the strap to which it is coupled thereby to permit the harness to function correctly.

SUMMARY OF THE INVENTION

The present invention relates to a sling means for supporting a shoulder harness from a roof rail of a vehicle body. The sling means includes a strap having loop means at each end. An anchor plate means is coupled to the strap through the loop means at one end and has a fastener device receiving aperture for hanging the strap to the roof rail. A ring assembly means is coupled to the strap through the loop means at the other end. The improvement embodying the present invention comprises a projecting means on the ring assembly means extending longitudinally of the strap. A pocket means is formed on the strap and encompasses the projecting means. The projecting means and the strap pocket means coact to restrain the ring assembly means against twisting or rotating movement in the plane of the strap.

DESCRIPTION OF THE DRAWING

Further features and advantages of the present invention will be made more apparent as this description proceeds, reference being had to the accompanying drawing, wherein:

FIG. 1 is a side elevation of a vehicle occupant restrained by a seat belt system including a shoulder harness supporting sling mean embodying the present invention;

FIG. 2 is a plan view illustrating a first embodiment of the sling means; and

FIG. 3 is a longitudinal section view on the line 3—3 of FIG. 2.

DETAILED DESCRIPTION OF THE INVENTION

For the purpose of illustration, there is shown in dot and dash outline a portion of a vehicle body, generally designated 10, having a bucket-type front seat 11. The vehicle occupant is shown restrained in the vehicle seat by a restraint system comprising a lap belt having two belt sections 12 and 13. One end of the belt section 12 is anchored by a conventional attachment device 14 to the floor anchoring ring 15. The other end of belt section 12 carries a buckle device 16. The visible end of belt section 13 carries a tongue element 17 adapted to coact with the buckle device 16. The other or outboard end (not visible) of the belt section 13 is carried on the reel of a locking retractor mechanism.

In addition to the lap belt sections 12 and 13, the restraint system includes a diagonal harness strap 18. The harness strap is attached at its inboard end by a rivet or pin 19 to the lap belt section 13 tongue element 17, crosses the chest of the seat occupant and passes over his shoulder to the lower end of a sling assembly, generally designated 21. The sling assembly 21 is anchored to the roof rail structure of the vehicle body above and rearwardly of the seat structure 11. From the lower end of the sling assembly 21, the harness strap drops to the floor of the vehicle to a vehicle sensitive retractor 22. This is the type of retractor that permits free retraction and protraction of the harness strap to accommodate fore and aft changes in position of the vehicle operator but which through inertial means locks the harness strap upon sudden stoppage of the vehicle.

The use of the shoulder harness retractor 22 mounted on the vehicle floor necessitates the use of the sling means 21 as a means of supporting the harness at the roof rail to maintain its proper angle as the harness passes over the shoulder of the seat occupant.

The sling assembly 21 as shown in FIG. 1 is covered by an elongated plastic boot 23. FIGS. 2 and 3 disclose the details of the sling assembly 21 without the covering boot.

The sling assembly 21 includes a strap 24 of seat belt webbing material folded over to form loop ends 25 and 26, respectively, at each end and stitched intermediate the ends as indicated by the stitch patterns 27 and 28. It will be understood that the stitching occurs after the necessary hardware has been assembled to the strap 24.

The hardware comprises an anchor plate 29 having a rounded end 31 apertured at 32 to receive a bolt or other suitable fastener device (not shown) by which the anchor device is swively fastened to the vehicle roof rail. The anchor plate 29 is slotted at its other end 33 to provide a substantially oval shaped aperture 34 through which the strap material is threaded to form the loop 25 coupling the anchor plate 29 to the strap 24. The end 33 of the anchor plate 29 is coated with a clear polyvinyl chloride coating 35 to provide a low friction surface against which the strap material rubs during use of the passenger restraint system.

The end of the sling assembly 21 opposite the roof rail attachable end 31 carries a ring assembly means 36 which comprises an oblong ring 37 having an aperture 38 through which the webbing of the shoulder harness strap 18 is adapted to slidably pass. The ring 37 is coupled to a bracket 39 comprising sheet metal formed with a loop 41 at one end through which an elongated leg 42 of the ring 37 passes. Bracket 39 has a substantially oblong aperture 43 through which the strap material is threaded to form the loop 26 coupling the ring assembly means 36 to the strap 24. The bracket 39 is also frictionally insulated from the strap material 24 by a polyvinyl chloride coating 44.

An important feature of the present invention is the provision of an anti-twist or anti-rotation projecting means on the ring assembly means 36 which extends longitudinally of the strap 24 into a pocket means to restrain the ring assembly means 36 against twisting or rotating in the plane of the strap 24. The projecting means comprises a flat finger appendage or tab 45 integrally formed on the bracket 39. The finger or tab 45 fits between layers of the strap 24 which is stitched as indicated at 46 to form a pocket means. The coaction between the fingers or tab 45 in the pocket means prevents twisting or rotation movement of the ring assembly means 36 in the plane of the strap 24.

Without the tab 45, such rotation of the ring assembly means will occur during the gyrations of the sling means strap and the harness strap resulting from the sudden movements of the vehicle under crash barrier or vehicle to vehicle impact conditions. This can result in the webbing material bunching at one end of the slots or apertures 38 and 43. This bunching action with the resultant high stresses placed on the webbing results frequently in a cut webbing with subsequent premature failure of the restraint system. The finger appendage or tab 45 projecting into the pocket means formed by the stitching 46 prevents the rotation of the ring assembly means 36 relative to the end of the strap 24 by transferring the twisting or rotational forces to the strap causing the latter to flex against the forces tending to cause the bunching of webbing material in the apertures 38-43.

It is to be understood that the invention is not limited to the exact construction illustrated and described above, but that various changes and modifications may be made without departing from the spirit and scope of the invention defined by the following claims:

I claim:

1. Sling assembly means for supporting a shoulder harness from a roof rail of a vehicle body,
   the sling assembly means including a strap having loop means at each end,
   anchor plate means coupled to the strap through the loop means at one end and having a fastener device receiving aperture for hanging the strap to the roof rail,
   and a ring assembly means coupled to the strap through the loop means at the other end,
   wherein the improvement comprises:
   a projecting means on the ring assembly means extending longitudinally of the strap,
   and pocket means on the strap encompassing the projecting means,
   the projecting means and the strap pocket means coacting to restrain the ring assembly means against twisting movement in the plane of the strap.

2. Sling assembly means according to claim 1, in which:
   the projecting means comprises a flat finger appendage on the ring assembly means,
   and the pocket means comprising overlapping layers of the strap stitched to form a pocket.

3. A sling assembly means for supporting a shoulder harness from a roof rail of a vehicle body comprising:
   a flat strap folded over and stitched together at each end to form end loops,
   anchor plate means coupled to the strap through the loop at one end and having a fastener device receiving aperture for hanging the strap from the roof rail,
   a ring assembly means having an elongated ring through which a segment of the shoulder harness is adapted to pass,
   a bracket member having a loop portion receiving one elongated side of the elongated ring,
   the bracket member having an apertured body portion receiving the loop at the other end of the strap to couple the ring assembly to the strap,
   a projecting means on the ring assembly extending longitudinally of the strap,
   and pocket means on the strap encompassing the projecting means,
   the projecting means and the pocket means on the strap coacting to restrain the ring assembly means against rotating movement in the plane of the strap.

4. Sling assembly means according to claim 3, in which:
   the projecting means comprises a flat finger appendage on the ring assembly means bracket.

5. Sling means according to claim 4, in which:
   the pocket means comprises overlying layers of the strap stitched to form a pocket receiving the finger appendage.

* * * * *